(12) United States Patent
Wiegman

(10) Patent No.: US 11,532,186 B1
(45) Date of Patent: Dec. 20, 2022

(54) SYSTEMS AND METHODS FOR COMMUNICATING DATA OF A VEHICLE

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/405,516

(22) Filed: Aug. 18, 2021

(51) Int. Cl.
*G07C 5/00* (2006.01)
*B60L 58/16* (2019.01)
*G07C 5/08* (2006.01)

(52) U.S. Cl.
CPC .............. *G07C 5/008* (2013.01); *B60L 58/16* (2019.02); *G07C 5/085* (2013.01); *G07C 5/0808* (2013.01)

(58) Field of Classification Search
CPC ...... G07C 5/008; G07C 5/0808; G07C 5/085; B60L 58/16
See application file for complete search history.

(56) References Cited

U.S. PATENT DOCUMENTS

| | | | |
|---|---|---|---|
| 6,181,990 B1 | 1/2001 | Grabowsky et al. | |
| 7,328,011 B2 | 2/2008 | Fagan | |
| 7,596,435 B1 | 9/2009 | Tripathi | |
| 8,140,358 B1 | 3/2012 | Ling | |
| 8,682,509 B2 | 3/2014 | Goodrich | |
| 8,700,236 B1 | 4/2014 | Berman | |
| 9,682,785 B2 | 6/2017 | Pescod | |
| 10,332,324 B2 * | 6/2019 | Jover | G07C 5/08 |
| 10,375,147 B2 * | 8/2019 | Preissl | B64C 27/20 |
| 10,819,771 B2 | 10/2020 | Preissl | |
| 2004/0008253 A1 | 1/2004 | Monroe | |
| 2004/0027255 A1 | 2/2004 | Greenbaum | |
| 2004/0260777 A1 | 12/2004 | Kolb | |
| 2007/0072639 A1 | 3/2007 | Frost | |
| 2010/0267375 A1 | 10/2010 | Lemmon | |
| 2011/0012720 A1 | 10/2011 | Shavit | |
| 2012/0191273 A1 | 7/2012 | Jacobs | |
| 2012/0265372 A1 | 10/2012 | Hedrick | |
| 2014/0081483 A1 | 3/2014 | Weinmann | |
| 2014/0136658 A1 | 5/2014 | Wahler | |
| 2015/0032296 A1 | 1/2015 | Girard | |
| 2015/0120132 A1 | 4/2015 | Kramer | |

(Continued)

*Primary Examiner* — Michael V Kerrigan
(74) *Attorney, Agent, or Firm* — Caldwell Intellectual Property Law

(57) ABSTRACT

A system, method and computer program product for communicating data of a vehicle. The system includes a data recording device and a data transmitting device coupled to the vehicle. The data recording device is configured to receive at least a vehicle datum during operation of the vehicle, determine a subset of the at least a vehicle datum to be stored, wherein the subset of data is stored during operation of the vehicle, and store the subset of the at least a vehicle datum as a stored vehicle data, wherein the stored vehicle data comprises a diagnostic datum of a vehicle component. The data transmitting device is configured to initiate communication with an independent data communication device as a function of a connection to a network and transmit the stored vehicle data to the independent data communication device as a function of the connection to the network.

21 Claims, 6 Drawing Sheets

(56) References Cited

U.S. PATENT DOCUMENTS

| | | |
|---|---|---|
| 2015/0339241 A1 | 11/2015 | Warner |
| 2016/0036513 A1 | 2/2016 | Klippert |
| 2016/0049019 A1 | 2/2016 | Mahalingaiah |
| 2016/0101876 A1* | 4/2016 | Wolfe .................... B64D 45/00 701/31.4 |
| 2016/0260264 A1 | 9/2016 | Shih |
| 2017/0142187 A1 | 5/2017 | Pimentel |
| 2017/0228945 A1 | 8/2017 | Lee |
| 2017/0293809 A1 | 10/2017 | Thompson |
| 2017/0367882 A1 | 12/2017 | Briggs |
| 2018/0146505 A1 | 5/2018 | Laur |
| 2021/0206499 A1* | 7/2021 | Balachandran ........ B64D 27/24 |

* cited by examiner

SYSTEMS AND METHODS FOR COMMUNICATING DATA OF A VEHICLE

FIELD OF THE INVENTION

The present invention generally relates to the field of data communication. In particular, the present invention is directed to systems and methods for communicating data of a vehicle.

BACKGROUND

Vehicle data can provide useful information on a number of vehicle usage and operational features and characteristics. Data can be analyzed to provide guidance to users, operators and manufacturers for knowledge, modifications and improvements.

SUMMARY OF THE DISCLOSURE

In an aspect a system for communicating data of a vehicle is provided. The system generally includes a data recording device coupled to the vehicle and a data transmitting device coupled to the vehicle. The data recording device is configured to receive at least a vehicle datum during operation of the vehicle, determine a subset of the at least a vehicle datum to be stored, wherein the subset of data is stored during operation of the vehicle, and store the subset of the at least a vehicle datum as a stored vehicle data, wherein the stored vehicle data comprises a diagnostic datum of a vehicle component. The data transmitting device is configured to initiate communication with an independent data communication device as a function of a connection to a network, and transmit the stored vehicle data to the independent data communication device as a function of the connection to the network.

In another aspect a method for communicating data of a vehicle is provided. The method includes receiving, at a data recording device coupled to a vehicle, at least a vehicle datum during operation of the vehicle, determining, at the data recording device, a subset of the at least a vehicle datum to be stored, wherein the subset of data is stored during operation of the vehicle, storing, at the data recording device, the subset of the at least a vehicle datum as a stored vehicle data, wherein the stored vehicle data comprises a diagnostic datum of a vehicle component, initiating, at a data transmitting device coupled to the vehicle, communication with an independent data communication device as a function of a connection to a network, and transmitting, at the data transmitting device, the stored vehicle data to the independent data communication device as a function of the connection to the network.

In yet another aspect a computer program product for communicating data of a vehicle is provided. The computer program product is embodied in a non-transitory computer readable medium and includes computer instructions for receiving, at a data recording device coupled to a vehicle, at least a vehicle datum during operation of the vehicle, determining, at the data recording device, a subset of the at least a vehicle datum to be stored, wherein the subset of data is stored during operation of the vehicle, storing, at the data recording device, the subset of the at least a vehicle datum as a stored vehicle data, wherein the stored vehicle data comprises a diagnostic datum of a vehicle component, initiating, at a data transmitting device coupled to the vehicle, communication with an independent data communication device as a function of a connection to a network, and transmitting, at the data transmitting device, the stored vehicle data to the independent data communication device as a function of the connection to the network.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
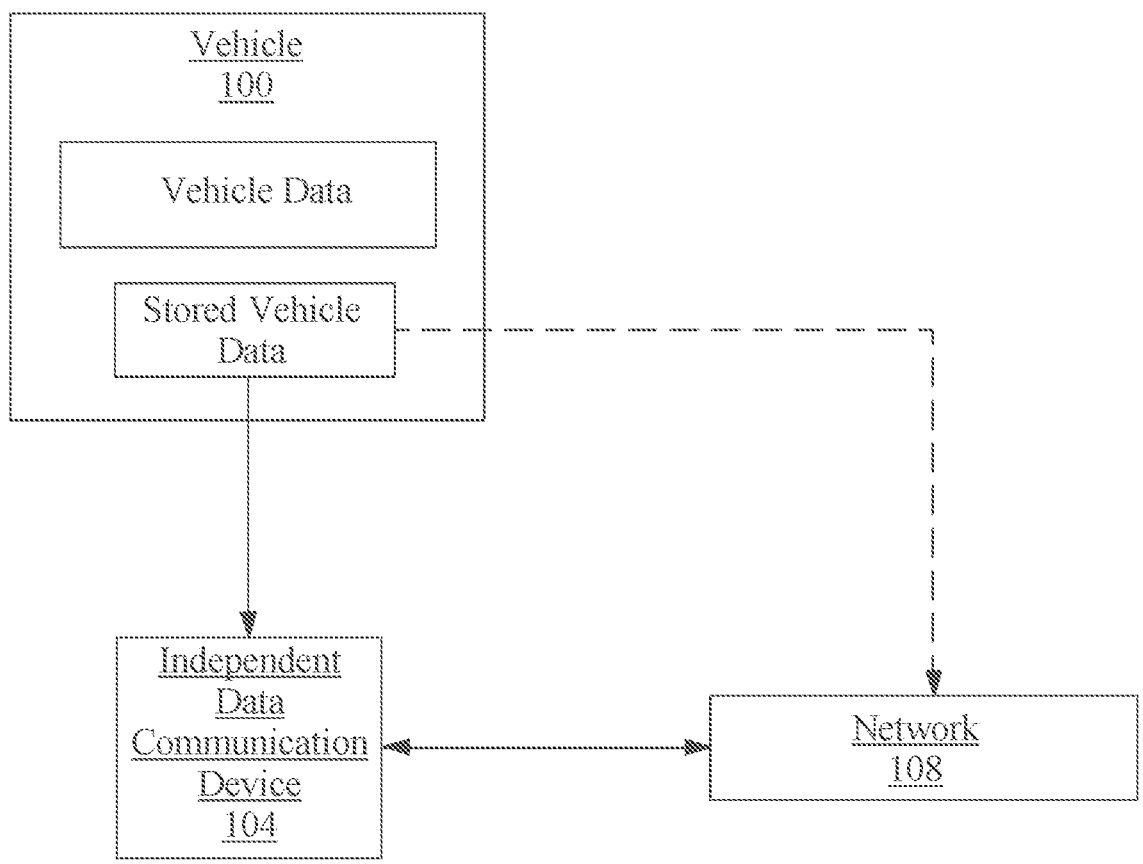
FIG. 1 is a block diagram of an exemplary embodiment of data transfer from a vehicle to a device including data uploading capability.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", "upward", "downward", "forward", "backward" and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Vehicle data may be used to analyze usage patterns, determine efficient trajectories, or determine other relevant metrics. Analysis may require a large amount of computing power and in some cases is based on vehicle data from multiple vehicles. In some instances, weight or connectivity limitations prevent the analysis from occurring onboard the vehicle.

At a high level, aspects of the present disclosure are directed to systems and methods for communicating data of vehicle. In an embodiment, the vehicle may include an electric vehicle. Aspects of the present disclosure can be used to communicate flight data of an aircraft. Aspects of the present disclosure can also be used to analyze diagnostic data of a vehicle such as, and without limitation, an aircraft or automobile. This is so, at least in part, because data stored on a vehicle (e.g. aircraft, automobile, and the like, among others) may be communicated to an independent device and therefrom to an online network for further study. Aspects of the present disclosure desirably allow for the use of an intermediary independent data communication device to facilitate communication between a vehicle data communication system and a network. Exemplary embodiments illustrating aspects of the present disclosure are described below in the context of several specific examples.

In some embodiments, systems and methods for communicating data of a vehicle are disclosed. In an embodiment, a vehicle data communication and collection method is provided. This method may include receiving vehicle data, determining that an internet connection is not available, storing the vehicle data, determining that an internet connection has become available, and transmitting the vehicle data based at least in part on the determination that an internet connection has become available. Various actions may be executed based on the determination of whether an internet connection is available, such as intermittent connectivity checks, prompting, or locking the vehicle. In an embodiment, the method may include collecting, storing and/or transmitting diagnostic data of a vehicle.

Vehicle data may be utilized by pilots, drivers, a vehicle company, a fleet management organization, traffic controllers, scientists, and the like, among others, to survey usage patterns, determine ways to improve trips, or perform other analyses or assessments. In some instances, it may be difficult or impractical to perform vehicle data analysis onboard a vehicle due to computing requirements, weight constraints or other logistical considerations. Vehicle data from multiple vehicles may be desired, for which a means of data congregation may be advantageous. However, vehicles traveling in remote areas without, for example, a Wi-Fi or cellular connection or at least a reliable and/or stable one, may experience difficulties in communicating vehicle data to another party or vehicle or to a shared network, or the like.

In accordance with at least some embodiments as disclosed herein, a check may be performed to determine whether an internet connection is available, and data management can be based upon the determination. For example, vehicle data may be relayed in real-time in the event an internet connection is available during a trip. In the event an internet connection is not available during the trip, vehicle data can be maintained until a connection is available. Data for multiple vehicles may be sent to a shared network and analyzed, with the resulting analysis provided to relevant parties. In an embodiment, an independent intermediary device may be utilized to store vehicle data an transmit it to a network when an internet connection becomes available.

In accordance with at least some embodiments as disclosed herein, a system and a method for communicating data of a vehicle is provided. System may include, and method may utilize, a data recording device and a data transmitting device onboard the vehicle. In an embodiment, a single device may include data recording device and data transmitting device. In some embodiments, a lower resolution data or subset of data recorded by the recording device may be desired for analysis. In some embodiments, a second independent data communication device, either installed on the vehicle or remote from the vehicle, may be used to execute reception of vehicle data and transmittance of it to a network. A subset of vehicle data may be transferred to and stored on independent data communication device. For example, and without limitation, a portable device capable of being transported independently of the vehicle such as a smart phone, tablet, smart watch, or other internet of things (IoT) device may be used. A portable device may be desirable in the event vehicle is not easily transported to a location with an internet connection (e.g. the vehicle is an aircraft that typically lands on water or a large truck designed for specific terrain). At least some steps in accordance with embodiments of the disclosed methods, may be executed by an application capable of running on multiple platforms.

Now referring to FIG. 1, an exemplary embodiment of data transfer from a vehicle 100 to a network 108 utilizing an intermediary independent data communication device 104 is illustrated. Vehicle 100, in some embodiments, may include an aircraft, an electric aircraft, an electric vertical takeoff and landing (eVTOL), a hybrid-electric aircraft, among other types of vehicles. Vehicle 100 may include, without limitation, any vehicle such as an aircraft, watercraft, automobile such as an electric car, or any other appropriate vehicle. In automobile embodiments, vehicle data may include automobile flight or trip data. In aircraft embodiments, vehicle data may include aircraft flight data. As used in this disclosure, "vehicle data" is any information or data related to a particular vehicle configuration, its operation and/or its surrounding. For example, and without limitation, vehicle data may include actuator positions, pilot instructions, flight computer instructions, sensor data, engine information, speed data, location or position data, time and date, aircraft state of health, flight diagnostics data, power data, power diagnostics data, battery management data, battery diagnostics data, flight data, flight attitude date, aircraft pitch data, aircraft yaw data, aircraft roll data, weather data, trajectory data, battery health data, propulsion components data, propulsion health or diagnostics data, and/or any other appropriate data, as needed or desired.

Still referring to FIG. 1, as shown, flight data is transferred or transmitted from vehicle 100 to independent data communication device 104. For example, and without limitation, data transfer may occur following an aircraft landing. In some embodiments, data transfer may occur each time a flight or trip is completed by vehicle 100. Flight data may be collected during flight and stored on vehicle 100 using a data recording device such as an electronic recording device. In an embodiment, a subset of the detailed flight data may be transferred to independent data communication device 104 in the event data recording device collects more detailed flight data than is desired for analysis. In some embodiments, time series data and log files are stored onboard vehicle 100. For example, time series data may be transferred to independent data communication device 104 whereas the log files are not. Camera footage, video data and/or audio data (e.g. from inside an aircraft's fuselage)

may be recorded, stored and transferred or transmitted. In some embodiments, flight data such as attitude data (roll, pitch, yaw), altitude data, trajectory data, energy consumption data, vertical and/or horizontal thrust data, flight trajectory data, flight transition data, environmental data, speed data, position or location data, weather data, vehicle diagnostics data, vehicle state of health data, battery management data, power data, power consumption data, safety data, payload data, air traffic data, navigation data, and the like, among others, may be recorded, stored, and transferred or transmitted. As used in this disclosure, a "data recording device" is a device, mechanism, system or means capable of receiving, or accessing, information, signals or data and storing information, signals or data. For example, and without limitation, a data recording device may include electronic recorders, digital recorders, analog recorders, disk recorders, minidisk recorders, hard disk recorders, magnetic recorders, tape recorders, optical recorders, and the like, among others.

Still referring to FIG. 1, in some cases, a dependable internet and/or cellular connection may not be available during flight or at landing. In some embodiments, data transfer between a computer memory (e.g. of a data recording device) onboard vehicle 100 and independent data communication device 104 occurs over a wireless connection that does not require internet. For example, and without limitation, an available Bluetooth connection may be used or a local area network (LAN) may be generated on vehicle 100. In the event a local area network is used, independent data communication device 104 receives data from a vehicle data transmitting device on the local area network by specifying a corresponding hard-coded internet protocol (IP) address. In some embodiments, data recording or storing device may be used transmit data to independent data communication device 104. A wireless connection may be used to decrease steps a pilot or user should take to facilitate data transfer and/or communication. For example, a suitable portable device may not be plugged in anywhere on vehicle 100. In some embodiments, a wired connection such as a universal serial bus (USB) connection may be used for data transfer or transmission. Independent data communication device 104 may include, without limitation, a smart phone, tablet, smart watch, or other IoT device. Independent data communication device 104 may include, incorporate, or utilize an application designed to facilitate data transfer and storage of collected data.

Still referring to FIG. 1, in some embodiments, independent data communication device 104 may be independently spaced from or remote from vehicle 100. In some embodiments, independent data communication device 104 may be independently installed in vehicle 100 or may be independently available on vehicle 100. Thus, independent data communication device 104 in these embodiments is not a part of vehicle 100. In a modified embodiment, independent data communication device 104 may be a part of vehicle 100.

Still referring to FIG. 1, as used in this disclosure, "independent" means that an item, element, component, device, or system is not fixedly or permanently connected or attached to a main body such as a vehicle. Thus, an "independent data communication device" is a device which is removably attached to vehicle, available on vehicle, or spaced from or remote from vehicle.

Still referring to FIG. 1, in embodiments wherein independent data communication device 104 is installed within vehicle or part of vehicle, the entire vehicle 100 may be transported to a location with a network connection. In a modified embodiment, flight data from data recording device and/or data transmitting device may not be transmitted to an independent data communication device 104. Flight recording device and/or flight transmitting device may include software that performs the internet check and facilitates data transfer.

Continuing to refer to FIG. 1, flight data is transferred or transmitted from independent data communication device 104 to a network 108 or the like. In some embodiment, flight data is uploaded from independent data communication device 104 to network 108. Independent data communication device 104 may be transported to a location with an internet connection after it receives flight data from vehicle 100. For example, independent data communication device 104 may be a personal device of a user, driver or pilot, and when the user returns to home, work, or a location with an internet connection, the flight data may be uploaded to an online network. In some embodiments, an application installed on, included in or incorporated with independent data communication device 104 may enable the flight data to be synced to network 108 automatically. As used in this disclosure, an "internet connection" is an interconnection of two or more networks so that information, signals and/or data can pass between hosts on different networks. Internet connection may utilize various protocols such as, and without limitation, TCP/IP (Transmission Control Protocol/Internet Protocol), UDP/IP (User Datagram Protocol/Internet Protocol), HTTP (HyperText Transfer Protocol) and FTP (File Transfer Protocol), and the like, among others. Internet connection may use various connections such as, and without limitation, wireless connections, mobile network connections and radio frequency (RF) connections which may allow communication to be made with satellites, ground stations, and the like, for example, while vehicle is in flight or on a trip.

With continued reference to FIG. 1, syncing to an online network may allow the flight data to be processed by a powerful processer or be analyzed together with data from other vehicles. In some embodiments, the flight data is uploaded to an online network where it is downloaded by a separate processor. In some embodiments, the flight data is analyzed on the online network, for example by using online tools. In some embodiments, the flight data is uploaded via an internet connection to a processor that congregates and processes flight data for multiple vehicles. An vehicle company may have access to the online network or congregational processor. The vehicle company may make decisions for future designs of the vehicle or provide advice to pilots based on the flight data.

Figure 2:
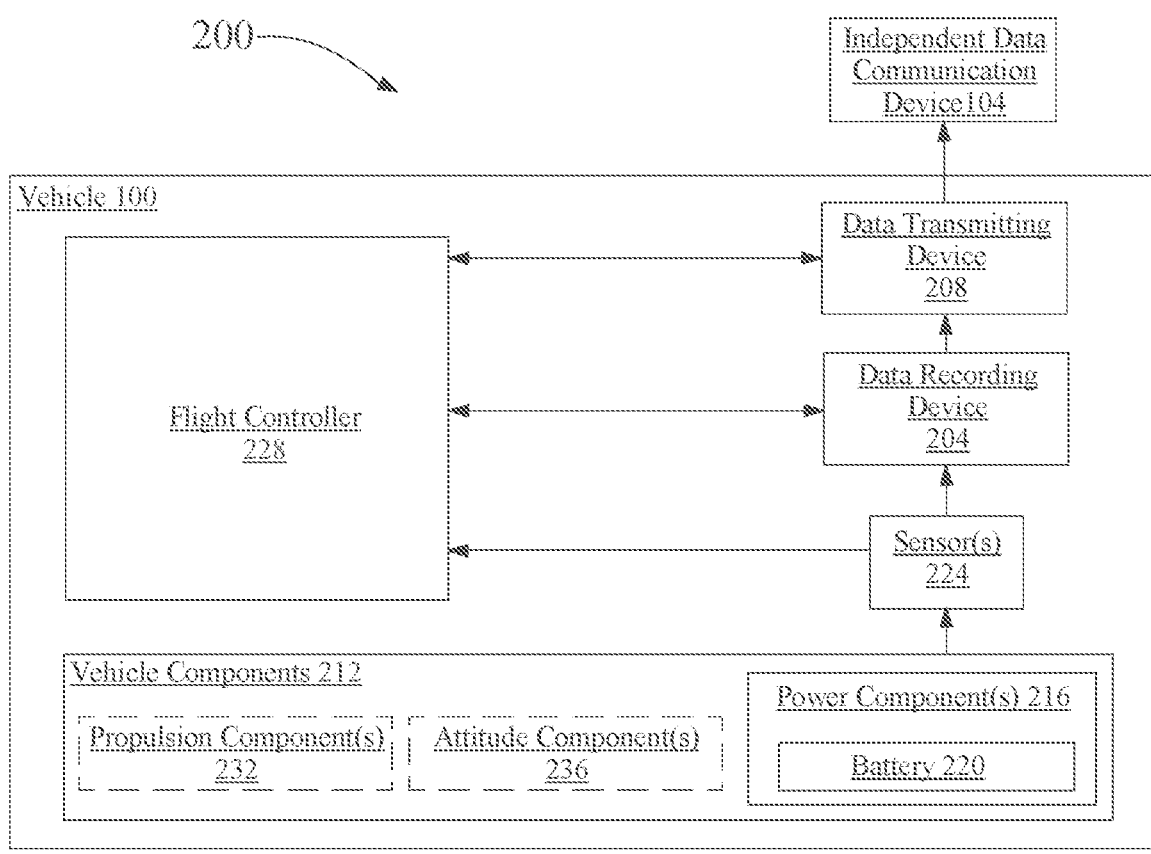
FIG. 2 is a block diagram of an exemplary embodiment of a vehicle including a data communication system and a flight controller.

Now referring to FIG. 2, an exemplary embodiment of a vehicle 100 including a system 200 for communicating data of a vehicle is illustrated. In an embodiment, system may include coupled or onboard flight data collection elements and associated vehicle elements. In an embodiment, vehicle includes a data communication system, which may include a data recording device (or flight data recorder) and a data transmitting device, a flight controller, which may include a computing device (or flight computer) and vehicle controls, and one or more sensors and/or sensor suites. Data recording device (or flight data recorder) may record flight data at regular intervals For example, and without limitation, every half second throughout flight. In some embodiments, the data recording device (or flight data recorder) records data in faster intervals in the event an abnormal change is detected. For example, if an extreme change in flight conditions, such as attitude is recorded or detected, data recording device (or flight data recorder) may increase the frequency of recordings. In one example, if an extreme change in flight conditions, such as yaw is recorded or detected, data recording device (or flight data recorder) may increase the frequency of recordings. In another example, if an extreme change in flight conditions, such as pitch is recorded or detected, data recording device (or flight data recorder) may increase the frequency of recordings. In yet another example, if an extreme change in flight conditions, such as roll is recorded or detected, data recording device (or flight data recorder) may increase the frequency of recordings. In some embodiments, data recording device (or flight data recorder) may record, without limitation, actuator positions, pilot or user instructions, flight computer instructions, sensor data, engine information, time and date, vehicle state of health, flight diagnostics data, power data, power diagnostics data, battery management data, battery diagnostics data, flight data, flight attitude date, vehicle pitch data, vehicle yaw data, vehicle roll data, weather data, trajectory data, battery health data, propulsion components data, propulsion health or diagnostics data, and/or any other appropriate data, as needed or desired. For example, and without limitation, data recording device (or flight data recorder) may receive inputs from flight controller, which may include flight computer or computing device and flight controls, and one or more sensors and/or sensor suites.

Referring now to FIG. 2 in more specificity, vehicle 100 includes a system for communicating data or a data communication system 200 of a vehicle. In some embodiments, system 200 includes a data recording device 204 coupled to the vehicle 100 and a data transmitting (or transferring) device coupled to the vehicle 100. Data recording device 204 is configured to receive at least a vehicle datum during operation of vehicle 100, to determine a subset of the at least a vehicle datum to be stored, wherein the subset of data is stored during operation of vehicle 100, and to store the subset of the at least a vehicle datum as a stored vehicle data, wherein the stored vehicle data includes a diagnostic datum of a vehicle component 212. Data transmitting device is configured to initiate communication with an independent data communication device 104 as a function of a connection to a network (e.g. network 108 of FIG. 1), and transmit the stored vehicle data to independent data communication device 104 as a function of the connection to network (e.g. network 108 of FIG. 1).

Still referring to FIG. 2, in an embodiment, vehicle 100 may include an aircraft. In an embodiment, vehicle 100 may include an electric aircraft. In an embodiment, vehicle 100 may include an electric vertical takeoff and landing (eVTOL) aircraft. In another embodiment, vehicle 100 may include a watercraft. In a further embodiment, vehicle 100 may include an electric watercraft. In still a further embodiment, vehicle 100 may include an automobile or car. In yet another embodiment, vehicle 100 may include an electric automobile or car.

Still referring to FIG. 2, as used in this disclosure an "aircraft" is any vehicle that may fly by gaining support from the air. As a non-limiting example, aircraft may include airplanes, helicopters, personal, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. In an embodiment, vehicle 100 may be a hybrid-electric aircraft and may be powered by a hybrid-electric power system. A hybrid-electric vehicle (HEV) or aircraft, as used in the present disclosure, is a type of hybrid vehicle or aircraft that combines a conventional internal combustion engine (ICE) system with an electric propulsion system.

Still referring to FIG. 2, in an embodiment, the subset of data may be stored locally at vehicle 100. For example, and without limitation, the subset of data may be stored in a memory, local datable, and the like, among others.

Still referring to FIG. 2, in an embodiment, independent data communication device 104 may be configured to determine whether a connection to an online network (e.g. network 108 of FIG. 1) is available to independent data communication device 104 and to upload the stored vehicle data to online network based at least in part on the determination that the connection is available. In an embodiment, connection may be an internet connection.

Still referring to FIG. 2, in some embodiments, data recording device 204 and data transmitting device 208 may be a single device, unit, element or component. In an embodiment, diagnostic datum may include at least a state of health datum of a power component 216 of vehicle 100. In an embodiment, power component 216 may include at least a battery 220 or a battery pack or a plurality of batteries. In an embodiment, independent data communication device 104 may be external to vehicle 100. In an embodiment, system 200 may be further configured to include at least a sensor 224 coupled to vehicle 100, wherein the sensor may be configured to detect at least a vehicle datum during operation of vehicle 100. In an embodiment, system may be further configured to include a flight controller 228 coupled to vehicle 100. In an embodiment, flight controller 228 may be configured to include data recording device 204 and/or data transmitting device 208. In an embodiment, the stored vehicle data may be stored locally at vehicle 100.

Still referring to FIG. 2, as used in this disclosure, a "battery" is an energy or power source which converts chemical energy into electrical energy. For example, and without limitation, battery may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 2, subset of vehicle data may be chosen based on how that data is to be utilized. For example, a fleet manager may be interested in vehicle efficiency related data and/or vehicle health and diagnostic data, an engineer may be interested in torque data, a scientist may be interested in environmental data, an air traffic controller may be interested in traffic related data, among other types of data subsets which may be of interest to certain parties.

Still referring to FIG. 2, as used in this disclosure, "diagnostic datum" is any operational information or data which is used for the purposes of troubleshooting problems. For example, and without limitation, diagnostic data may include vehicle's general health data, power level data, state of charge data, battery health data, electrical flow data, electrical fault data, torque data, motor seed data, and the like, among others.

Still referring to FIG. 2, in an embodiment, data recording device 204 and data transmitting device 208 may be a single device. In an embodiment, independent data communication device 104 is external to vehicle 100. At least data recording device 204 may be coupled (communicatively or otherwise) to at least a sensor 224, a plurality of sensors or a sensor suite. In an embodiment, power component 216 may include at least a battery 220. System 200 may be coupled (communicatively or otherwise) to a controller or flight controller 228 of vehicle 100. Controller or flight controller 228 may include a flight computer or one or more computing devices and flight controls. In embodiments of an aircraft, data communication system 200 may be part of flight controller 228 of aircraft. In an embodiment, vehicle 100 may include an electric vehicle or hybrid-electric vehicle. In an embodiment, electric vehicle may include an electric aircraft. In an embodiment, electric aircraft may include an electric vertical takeoff and landing (eVTOL) aircraft. An associated method may include a method for communicating data of a vehicle 100. An associated computer program product may include a computer program product for communicating data of a vehicle 100. Computer program product may be embodied in a non-transitory computer readable medium and include computer instructions such as for communicating data of a vehicle 100. Vehicle 100 may also include one or more propulsion or flight components and one or more attitude or attitude control components 236.

Still referring to FIG. 2, in some embodiments, vehicle components 212 may include any of vehicle's elements which provide data, directly or indirectly, to data communication system 200 and/or data recording device 204. These may include, without limitation, power component 216, propulsion components 232, attitude or flight component 26, and the like, among others. Sensor 224, a plurality of sensors, and/or a sensor suite may detect datum or data from any of vehicle components and feed it to data communication system 200, data recording device 204 and/or flight controller 228. In a modified embodiment, flight component may feed data to data communication system 200 and/or data recording device 204.

Continuing to refer to FIG. 2, as used in this disclosure a "flight controller" is a computing device of a plurality of computing devices dedicated to data storage, security, distribution of traffic for load balancing, and flight instruction. Flight controller 128 may be coupled, communicatively, operatively or otherwise, to any of vehicle components 212. Flight controller 228 may include, without limitation, any of the flight controllers as disclosed in U.S. Nonprovisional application Ser. No. 16/929,206, filed on Jul. 15, 2020, entitled "A HOVER AND THRUST CONTROL ASSEMBLY FOR DUAL-MODE AIRCRAFT,", U.S. Nonprovisional application Ser. No. 17/001,845, filed on Aug. 25, 2020, entitled "A HOVER AND THRUST CONTROL ASSEMBLY FOR DUAL-MODE AIRCRAFT,", U.S. Nonprovisional application Ser. No. 17/321,662, filed on May 17, 2021, entitled "AIRCRAFT FOR FIXED PITCH LIFT,", U.S. Nonprovisional application Ser. No. 17/218,387, filed on Mar. 31, 2021, entitled "METHOD AND SYSTEM FOR FLY-BY-WIRE FLIGHT CONTROL CONFIGURED FOR USE IN ELECTRIC AIRCRAFT,", and U.S. Nonprovisional application Ser. No. 17/348,851 filed on Jun. 16, 2021, entitled "AIRCRAFT FOR VECTORING A PLURALITY OF PROPULSORS,", the entirety of each one of which is incorporated herein by reference.

With continued reference to FIG. 2, propulsion or flight components 232 may include any vehicle components which provide thrust and/or motion, and the like, to vehicle 100 so that it may follow a desired or required trajectory. These may include, without limitation, one or more lift components and/or one or more pusher components which may be embodied by one or more propulsors, propellers, rotors, blades, engines, arrangements thereof, and the like, among others. Data may be fed from propulsion or flight components 232 to data communication system 200 and/or data recording device 204 to indicate torque, RPM, and the like, among others. Pusher component and lift component (of propulsion or flight component(s) 232) may include any such components and related devices as disclosed in U.S. Nonprovisional application Ser. No. 16/427,298, filed on May 30, 2019, entitled "SELECTIVELY DEPLOYABLE HEATED PROPULSOR SYSTEM,", U.S. Nonprovisional application Ser. No. 16/703,225, filed on Dec. 4, 2019, entitled "AN INTEGRATED ELECTRIC PROPULSION ASSEMBLY,", U.S. Nonprovisional application Ser. No. 16/910,255, filed on Jun. 24, 2020, entitled "AN INTEGRATED ELECTRIC PROPULSION ASSEMBLY,", U.S. Nonprovisional application Ser. No. 17/319,155, filed on May 13, 2021, entitled "AIRCRAFT HAVING REVERSE THRUST CAPABILITIES,", U.S. Nonprovisional application Ser. No. 16/929,206, filed on Jul. 15, 2020, entitled "A HOVER AND THRUST CONTROL ASSEMBLY FOR DUAL-MODE AIRCRAFT,", U.S. Nonprovisional application Ser. No. 17/001,845, filed on Aug. 25, 2020, entitled "A HOVER AND THRUST CONTROL ASSEMBLY FOR DUAL-MODE AIRCRAFT,", U.S. Nonprovisional application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT,", and U.S. Nonprovisional application Ser. No. 17/321,662, filed on May 17, 2021, entitled "AIRCRAFT FOR FIXED PITCH LIFT,", the entirety of each one of which is incorporated herein by reference.

Still referring to FIG. 2, attitude (or attitude control) components 236 may include any vehicle components which provide and/or control attitude such as pitch, yaw, roll, and the like, of vehicle 100. One or more of sensors 224 may be utilized, as needed or desired, to detect and feed attitude data to data communication system 200 and/or data recording device 204. Attitude components 236 may include, without limitation, wings, winglets, associated control surfaces, flaps, ailerons, tabs, spoilers, and slats, and the like, among others.

In an embodiment, and still referring to FIG. 2, data communication system 200 and/or data recording device 204 may receive data, including diagnostic data, on vehicle's state of charge (or remaining energy or fuel capacity) from sensor(s) 224 and/or flight controller 228 coupled to or onboard vehicle 100. In an embodiment, vehicle 100 may include a battery management system such as any battery management system as described in U.S. Nonprovisional application Ser. No. 17/108,798, filed on Dec. 1, 2020, and entitled "SYSTEMS AND METHODS FOR A BATTERY MANAGEMENT SYSTEM INTEGRATED IN A BATTERY PACK CONFIGURED FOR USE IN ELECTRIC AIRCRAFT,", the entirety of which is incorporated herein by reference. Battery management system may provide vehicle's state of charge data to data communication system 200 and/or data recording device 204, which may be transmitted to an independent device (e.g. independent data communication device 104).

In an embodiment, and still referring to FIG. 2, data communication system 200 and/or data recording device 204 may receive data, including diagnostic data, on vehicle's state of health (e.g. any warning or failure signals or indications) from sensor(s) 224 and/or flight controller 228 coupled to or onboard vehicle 100. In an embodiment, vehicle 100 may include a system for monitoring health of a vehicle which may include one or more sensors as described in U.S. Nonprovisional application Ser. No. 17/320,329, filed on May 14, 2021, and entitled "SYSTEMS AND METHODS FOR MONITORING HEALTH OF AN ELECTRIC VERTICAL TAKE-OFF AND LANDING VEHICLE,", U.S. Nonprovisional application Ser. No. 17/374,055, filed on Jul. 13, 2021, and entitled "A SYSTEM AND METHOD FOR AUTOMATED AIR TRAFFIC CONTROL,", and U.S. Nonprovisional application Ser. No. 17/373,479, filed on Jul. 12, 2021, and entitled "SYSTEMS AND METHODS FOR OPTIMIZATION OF A RECHARGING FLIGHT PLAN FOR AN ELECTRIC VERTICAL TAKEOFF AND LANDING AIRCRAFT,", the entirety of each one of which is incorporated herein by reference. System for monitoring health of vehicle and/or associated one or more sensors may monitor the general health of the vehicle and/or that of the onboard power component(s) 216 including one or more batteries 220 (or a battery pack or battery system), propulsion or flight component(s) 232, and/or attitude or attitude control component(s) 236. System for monitoring health of an vehicle and/or associated one or more sensors (e.g. sensor(s) 224) may provide health data, including diagnostic data, to data communication system 200 and/or data recording device 204, which may be transmitted to an independent device (e.g. independent data communication device 104).

In an embodiment, and still referring to FIG. 2, vehicle 100 may include a plurality of sensors (e.g. sensor(s) 224), to monitor and/or assess vehicle's state of health, such as any sensors including voltage sensor, current sensor, temperature sensor, resistance sensor, environmental sensor, and the like, among others, as described in U.S. Nonprovisional application Ser. No. 16/599,538, filed on Oct. 11, 2019, and entitled "SYSTEMS AND METHODS FOR IN-FLIGHT OPERATIONAL ASSESSMENT,", the entirety of which is incorporated herein by reference. Plurality of sensors 224 may monitor the general health of the vehicle and/or that of the onboard power component(s) 216 including one or more batteries 220 (or a battery pack or battery system), propulsion or flight component(s) 232, and/or attitude or attitude control component(s) 236. Plurality of sensors may provide health data, including diagnostic data, to data communication system 200 and/or data recording device 204, which may be transmitted to an independent device (e.g. independent data communication device 104).

In an embodiment, and still referring to FIG. 2, vehicle 100 may include a battery management system, to monitor and/or manage vehicle's state of health, such as any battery management system with a sensor suite including a "cell failure" detection sensor as described in U.S. Nonprovisional application Ser. No. 17/108,798, filed on Dec. 1, 2020, and entitled "SYSTEMS AND METHODS FOR A BATTERY MANAGEMENT SYSTEM INTEGRATED IN A BATTERY PACK CONFIGURED FOR USE IN ELECTRIC AIRCRAFT,", the entirety of which is incorporated herein by reference. Sensor suite may monitor the general health of vehicle and the cell failure detection sensor may monitor the general health of the onboard battery cells. Sensor suite including cell failure detection sensor may provide health data, including diagnostic data and/or general health data, to data communication system 200 and/or data recording device 204, which may be transmitted to an independent device (e.g. independent data communication device 104).

Continuing to refer to FIG. 2, in an embodiment, one or more sensors 224 (or a suite of sensors) is coupled, communicatively or otherwise, to data communication system 200 and/or data recording device 204. Sensors 224 may include, without limitation, a temperature sensor, a pressure sensor, a weather sensor, an altitude sensor, a battery management sensor, a warning sensor, a failure sensor, a pitch sensor, a yaw sensor, a roll sensor, a speed sensor, an airspeed sensor, a ground speed sensor, a wind speed sensor, a position or location sensor, an environment sensor, an attitude sensor, a direction sensor, a weight sensor, a torque sensor, an RPM sensor, a force sensor, a load cell, a communication availability sensor, an angle sensor, a trajectory sensor, an inertial measurement unit (IMU), a gyroscope, a proximity sensor, a light sensor, one or more pitot tubes, and the like, among others. In some embodiments, one or more actuators or the like may be coupled to data communication system 200, data recording device 204, sensor(s) 224 and/or flight controller 228 so as to facilitate implementation of data reception, transmission and/or transfer as well as any commands and/or instructions from flight controller. These may be a part of flight controller or distinct from it.

Figure 3:
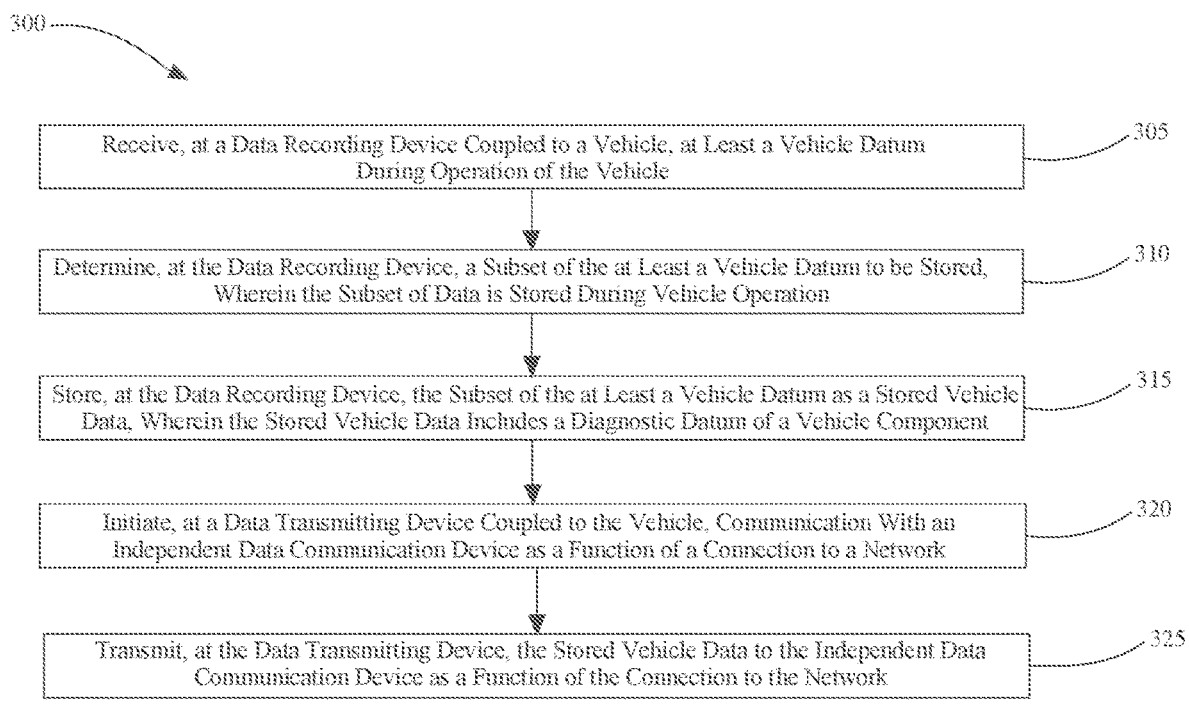
FIG. 3 is a block diagram of an exemplary embodiment of a method for communicating data of a vehicle.

Now referring to FIG. 3, an exemplary embodiment of a method 300 for communicating data of a vehicle is illustrated. In an embodiment, this may represent a flight data collection process relating to an aircraft. Initially, flight data may be collected and stored onboard vehicle. Flight data may be collected and stored on a "black box" or flight data recording device. In some embodiments, flight data recording device may store high resolution data. Flight data may be stored on a computer memory or the like. Then, a subset of flight data to be saved may be determined. Subset of flight data from recording device data may be saved to an independent (or separate) data communication device which may be a device either installed in vehicle, onboard vehicle, available on vehicle, a part of vehicle and/or a portable device. In the event an independent or separate device is not used, a subset of flight data determined not to be saved may be deleted from flight data recording device. Next, subset of flight data is saved to a device which in one embodiment may be independent (or separate) data communication device (or in an alternative embodiment may be flight data recording device). Subset of the flight data may interest data that is of interest to a user, pilot, fleet management organization, vehicle company and/or scientists. Subsequently, independent data communication device may be transported, if needed, to a location with an internet connection. After that, subset of flight data may be uploaded from independent data communication device to an online network or the like. Flight data may be downloaded from online network and processed, with processed flight data uploaded back to online network. In some embodiments, flight data may be processed on network. Finally, processed flight data from online network may be received by independent data communication device, vehicle, and/or any other interested party such as a user, pilot, fleet management organization, vehicle company and/or scientists. Receiving device may display processed flight data via an application, suitable interface, or the like, installed on such a device.

Referring now to FIG. 3 in more specificity, vehicle of method 300 may include any of the vehicles as disclosed herein and described above with reference to at least FIG. 1 and FIG. 2. For example, and without limitation, vehicle may include an aircraft, an automobile, a watercraft, and the like, among others. In some embodiments vehicle includes an electric vehicle (or hybrid-electric vehicle), such as and without limitation, an electric aircraft, an electric automobile or car, an electric watercraft, and the like, among others. In an embodiment, vehicle includes an electric vertical takeoff and landing (eVTOL) aircraft.

Still referring to FIG. 3, at step 305 a data recording device coupled to a vehicle receives at least a vehicle datum during operation of the vehicle. At step 310 the data recording device, determines a subset of the at least a vehicle datum to be stored, wherein the subset of data is stored during operation of the vehicle. At step 315 the data recording device stores the subset of the at least a vehicle datum as a stored vehicle data, wherein the stored vehicle data comprises a diagnostic datum of a vehicle component. Data recording device, in accordance with the method, may be any of such devices as disclosed herein and described above with reference to at least FIG. 2. Vehicle datum, subset of data, stored vehicle data, and diagnostic datum may be any of those as disclosed herein and described above with reference to at least FIG. 2.

Still referring to FIG. 3, at step 320 a data transmitting (or transferring) device coupled to the vehicle initiates communication with an independent data communication device as a function of a connection to a network. At step 325 the data transmitting (or transferring) device transmits the stored vehicle data to the independent data communication device as a function of the connection to the network. Data transmitting (or transferring) device, in accordance with the method, may be any of such devices as disclosed herein and described above with reference to at least FIG. 2. Independent data communication device may be any of such devices as disclosed herein and described above with reference to at least FIG. 1 and FIG. 2. Connection and network may be any of those as disclosed herein and described above with reference to at least FIG. 1. In some embodiments, data recording device and data transmitting device are a single device or system. In an embodiment, independent data communication device is configured to determine whether a connection to an online network is available to the independent data communication device and to upload the stored vehicle data to the online network based at least in part on the determination that the connection is available. In an embodiment, connection may be an internet connection.

In a modified embodiment of the method of FIG. 3, another embodiment of a flight data collection process is provided. Initially, flight data may be received and stored. After that, it may be determined whether an internet connection is available. In the event an internet connection is available, next, flight data may be transmitted. Flight data may be packaged and sent, wherein packaging may include formatting or editing the data. The data may be sent to an online network. After sending flight data or in the event an internet connection is not available, it may then be determined whether flight data gathering is complete. For example, flight data may be transmitted while vehicle is mid-flight or mid-trip. Gathering may be considered complete when vehicle has completed flight or trip. In the event flight data gathering is not complete, the process of the modified method may return to its initial step and start again. In the event flight data gathering is complete, next it may be determined whether all flight data has been transmitted. In the event an internet connection was not available during flight, flight data may not have been sent at all or in entirety. In the event all flight data is sent, the process may be considered to be finished. In the event not all flight data is sent, the stored flight data may be maintained. Maintaining stored data may comprise refreshing the data or ensuring the data is not overwritten. Next, it may be determined whether an internet connection is available. In the event an internet connection is not available, the stored flight data is maintained until an internet connection is available. Intermittent internet checks may be performed. In the event the internet connection is available, flight data may then be packaged and sent and the process may be considered finished.

In another modified embodiment of the method of FIG. 3, yet another embodiment of a flight data collection process is provided. In some embodiments, data transmission from a vehicle to an online network may occur solely after flight is complete. Flight data recording device (e.g. flight data recorder) activity may be limited to data collection during the time of flight. Then, it may be determined whether flight is complete. In the event flight is complete (e.g. when an aircraft has landed or an automobile has completed its trip), next, flight data may be received. In such embodiments, flight data may be received in the event flight data recording device (e.g. flight data recorder) is not the uploading (to network) device. For example, a portable device or uploading device installed or available on vehicle may receive flight data from data recording device (e.g. flight data recorder) coupled to or onboard the vehicle. Next, it may be determined whether an internet connection is available. In the event an internet connection is available, then, flight data may be transmitted and the process may be considered to be finished. Flight data may be transmitted to an online network. In the event an internet connection is not available, in a next step, flight data may be stored until it is determined that an internet connection is available.

In embodiments accordance with the present disclosure, processes and connections, and systems and software, as described above and herein as pertaining to an aircraft pertain to other types of vehicles analogously. For example, vehicle data or trip data may be considered rather than flight data. A vehicle or trip data recording device (e.g. vehicle data recorder) may be used rather than a flight data recording device (e.g. flight data recorder). Rather than determining whether a flight is complete, it may be determined whether a vehicle trip is complete. In some embodiments, completion of a trip or flight may be determined based on when a vehicle is turned on or off.

In yet another modified embodiment of the method of FIG. 3, still another embodiment of a vehicle data collection process is provided. Initially, vehicle data may be received. vehicle data may be received from a vehicle data recording device (e.g. vehicle data recorder) and/or vehicle data transmitting device (e.g. vehicle data transmitter) in the event a second independent data communication device is used for uploading vehicle data to an online network. Vehicle data may be received from, for example and without limitation, sensors, actuators, and the like, in the event vehicle data recording or transmitting device is used to directly upload vehicle data. Next, it may be determined that an internet connection is not available. For example, vehicle may travel through remote locations without connectivity. After that, vehicle data may be stored. For example, vehicle data may be stored on vehicle data recording device (e.g. vehicle data recorder) or second independent data communication device. Next, it may be determined that an internet connection has become available. As such, vehicle data may be transmitted (e.g. to network) based at least in part on the determination that an internet connection has become available.

In some embodiments, user actions throughout a vehicle data collection process may be provided. Initially, a vehicle trip is completed. Then, an independent data communication device may be brought in proximity to vehicle. In some embodiments, independent data communication device may include an application that sets up data to sync from a data recording and/or transmitting device onboard vehicle to independent device when independent device is brought within a set distance from vehicle and vehicle is detected to have completed a trip. The application may determine whether data recording and/or transmitting device onboard vehicle has stored data that has not yet been uploaded. In some embodiments, each trip is tracked with a unique trip number that is used to determine whether data has already been uploaded. For example, the trip number is incremented each time vehicle is turned on. Next, independent device may be brought to a location with an internet connection. In some embodiments, independent data communication device may include an application that automatically uploads vehicle data from independent device to specified online network when the independent device is brought into a location with an internet connection.

In some embodiments, an independent or separate portable device may not be used. A data uploading device may be installed in or available on (or in some cases, even be part of) vehicle. User (e.g. pilot or driver) actions could include ending the trip in a location with an internet connection or transporting vehicle to a location with an internet connection following trip completion.

In some embodiments, a vehicle data collection application may be provided. A vehicle data collection application may provide a simple interface for a user or passenger of vehicle to collect data from a vehicle and provide the data to an online network. In an embodiment, an independent, portable or mobile data communication device may include a display with a connected/disconnected button and a sync button, or the like. The buttons may comprise virtual buttons that appear on the device screen. When using an independent or separate device from vehicle data recording and/or transmitting device, connected/disconnected button may display "connected" when independent or separate device is connected to a vehicle data recording device (e.g. vehicle data recorder or storage device) onboard vehicle. "Connected" may let a pilot, driver or customer know that independent or separate device is able to begin the data transfer. Connected/disconnected button may display "disconnected" when the connection between independent or separate device and vehicle is broken. For example, an independent, separate, portable and/or mobile device may be brought out of range for Wi-Fi-direct or a cable connecting an independent (or separate) data communication device and a vehicle data recording and/or transmitting device (e.g. vehicle data recorder and/or transmitter) may be unplugged. In some embodiments, a user may press sync button when independent (or separate) data communication device is connected to begin data transfer from vehicle to independent or separate device. In some embodiments, sync button may be pressed when independent (or separate) data communication device is brought to a location with an internet connection. Pressing sync button in that environment may begin data transfer from independent (or separate) data communication device to an online network.

In various embodiments of the disclosed application, the interface of the application may take different forms. For example, and without limitation, application may comprise a "fetch from vehicle" button, "upload to cloud" button, and the like, among others.

In accordance with some embodiments, a vehicle data recording device and/or vehicle data transmitting device (e.g. electronic device) onboard vehicle may include a corresponding application program interface (API), which is used in transferring data from data recording and/or transmitting device to independent (or separate) data communication device (which may also be referred to as upload device). For example, data recording and/or transmitting device may include a time series database that has a corresponding API which allows a mobile phone, other smart device, or the like to access the data. An application on, for example and without limitation, a mobile phone, may issue requests from the API to retrieve data. A separate database may be used on independent, separate or portable data communication device, such as, and without limitation, a mobile database. Data may be transferred from mobile database to an online database, which also has a corresponding API. In some embodiments, a data visualization tool may read from online database.

In some embodiments, a plurality of independent, separate or portable data communication devices may connect to a network. For example, and without limitation, multiple such devices may upload vehicle data pertaining to multiple vehicles to a shared network. Processing may occur based on aggregated vehicle data. The aggregated vehicle data may be used for the purposes of a vehicle company, provided to customers interested in the vehicles, shared with research scientists, or provided to a fleet management organization, and the like, among others. A vehicle company or other owner of the shared network, for example, may determine how to process the data or access to the data.

In some embodiments, a vehicle data application for displaying processed vehicle data is provided. Processed vehicle data may be provided to a device from an online network and displayed via an application. The application may include data collection and data viewing features or it may be a separate application dedicated to data viewing and analytics. For example, a user may select specific parameters to view in various formats, such as graphs, charts, tables, and the like, among others. For example, and without limitation, a table, graph and/or chart may display energy consumption during flight or trip for a vehicle associated with a selected independent data communication device. The table, graph and/or chart may display, without limitation, average energy consumption during flight for all associated vehicles.

In some embodiments, a single independent, separate, portable and/or mobile device may be associated with multiple vehicles. A data collection or data viewing application installed on such a device may have a method of selecting a specific vehicle within the application. In various applications, various diagnostics may be performed and provided based on the vehicle data.

In some embodiments, and in particular for situations wherein independent data communication device (e.g. data uploading device) is a portable device which is not a part of vehicle, the portable device may be a user's personal device. A data collection and/or data viewing application may be installed on the user's personal portable device. In some embodiments, application may enable portable device to act as a key that unlocks vehicle, ensuring that a pilot, driver, or the like, has a device with the corresponding application installed when embarking on a trip using the vehicle. The application may comprise features to encourage or ensure a user syncs data to online network. For example, application may send reminders to a user or lock a user out of a vehicle if vehicle data has not been uploaded.

In some embodiments, a data upload prompt process may be provided. A first reminder may be provided and then in the event the reminder is not followed up on, the vehicle may be locked. Firstly, it may be determined whether vehicle data has been uploaded to a network within a set period of time. For example, vehicle data may be required to be uploaded within a few days of a trip. In the event vehicle data has not been uploaded to network within a set period of time, a reminder may then be sent to a device. The device may be an independent, separate or portable device, vehicle data recording and/or transmitting device, or device installed on vehicle that is not vehicle data recording and/or transmitting device. A data collection application on any such device may provide a reminder notification. After that, it may be determined whether vehicle data has been uploaded to network within a set period of time since sending the reminder. In the event vehicle data has not been uploaded to the network within a set period of time since sending the reminder, at this stage, the user may be locked from vehicle until vehicle data is uploaded to network. For example, an application on independent, separate or portable device, vehicle data recording and/or transmitting device, or device installed on vehicle that is not vehicle data recording and/or transmitting device may be used as a virtual key. Without uploading vehicle data, application may prevent vehicle from starting. In the event vehicle data has been uploaded (e.g. in the original set period of time, following the reminder, or following lock-out), at a final stage, it may be determined whether the process is done. For example, process may be finished in the event vehicle has not been taken on more trips or all vehicle data has been uploaded. In the event process is not done, subsequent iterations may be carried out, as needed or desired.

In some embodiments, methods, systems and software for collecting data as disclosed herein may be implemented on an aircraft, which in an embodiment, may include a multi-copter designed to fly over water. Such an aircraft may be typically landed on bodies of water, where an online or cellular connection may be less prevalent. In one embodiment, aircraft or multi-copter may include a fuselage including two booms which pass through it, perpendicular to fuselage. Booms may also pass-through aircraft floats which are located on either side of fuselage. One or more rotors may be positioned on one float and one or more rotors may be positioned on the other float. Rotors may also be positioned on booms on either side of a respective one of floats. Flight data collection methods, systems and/or software may be used to collect data on thrusts of rotors, pitch of aircraft, or any appropriate parameter, as needed or desired.

In some embodiments, in the event the methods, systems and/or software are executed on a portable IoT device, vehicle may be designed around such a device. For example, and without limitation, vehicle controls may comprise a slot for a tablet or smart phone. Inserting tablet or smart phone therein may unlock vehicle.

Figure 4:
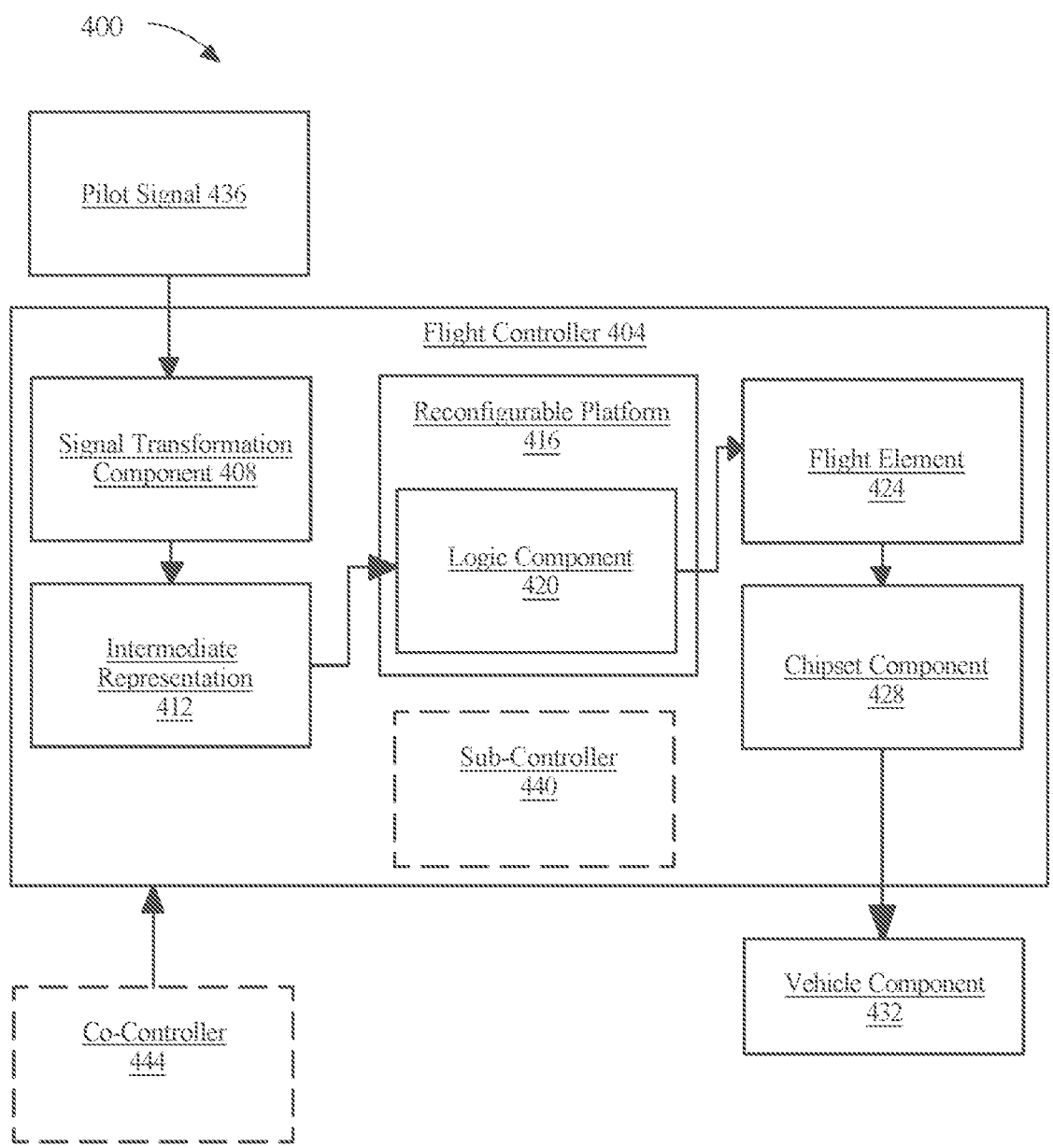
FIG. 4 is a block diagram of an exemplary embodiment of a flight controller.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neuman and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a vehicle component 432. As used in this disclosure a "vehicle component" is a portion of a vehicle that can be moved or adjusted to affect one or more flight elements. For example, vehicle component 432 may include a component used to affect an aircrafts' roll and pitch which may comprise one or more ailerons. As a further example, vehicle component 432 may include a rudder to control yaw of an aircraft. In an embodiment, chipset component 428 may be configured to communicate with a plurality of vehicle components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of vehicle component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\phi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
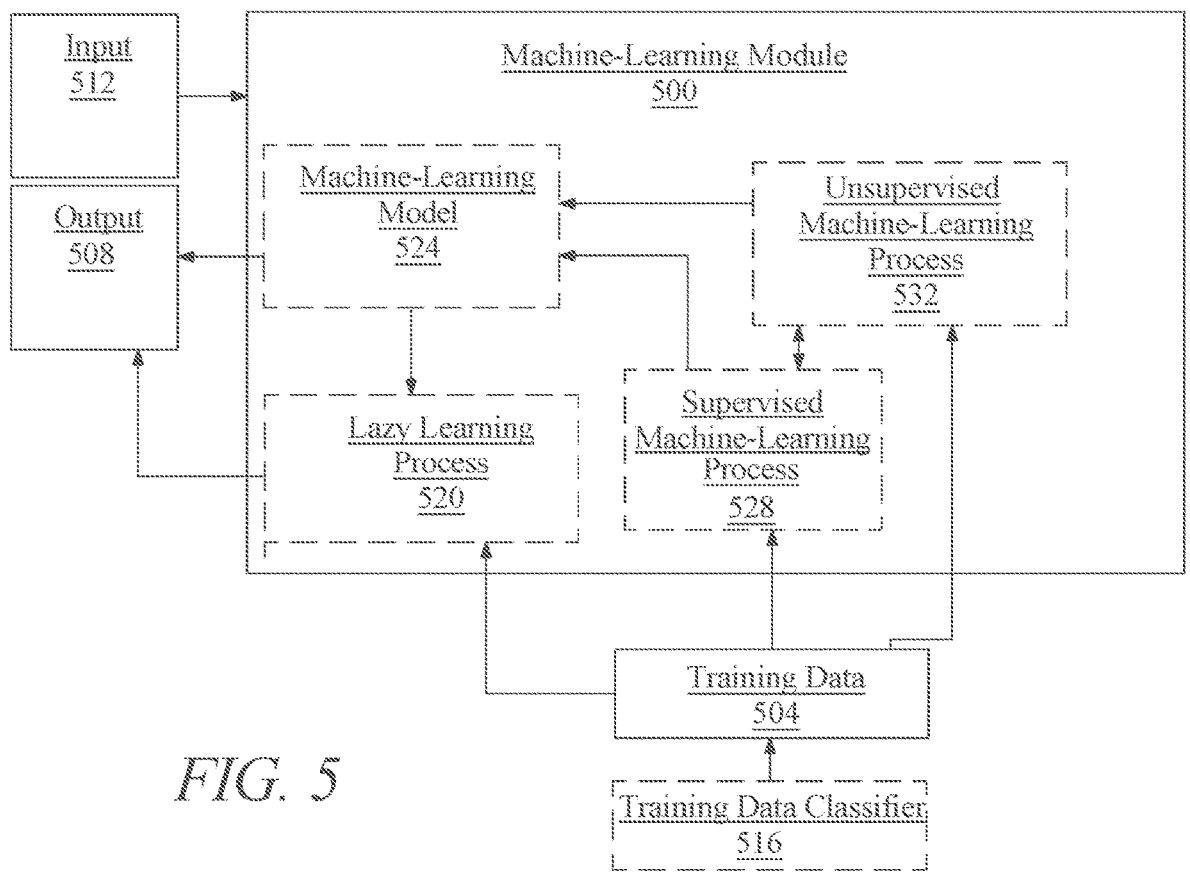
FIG. 5 is a block diagram of an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
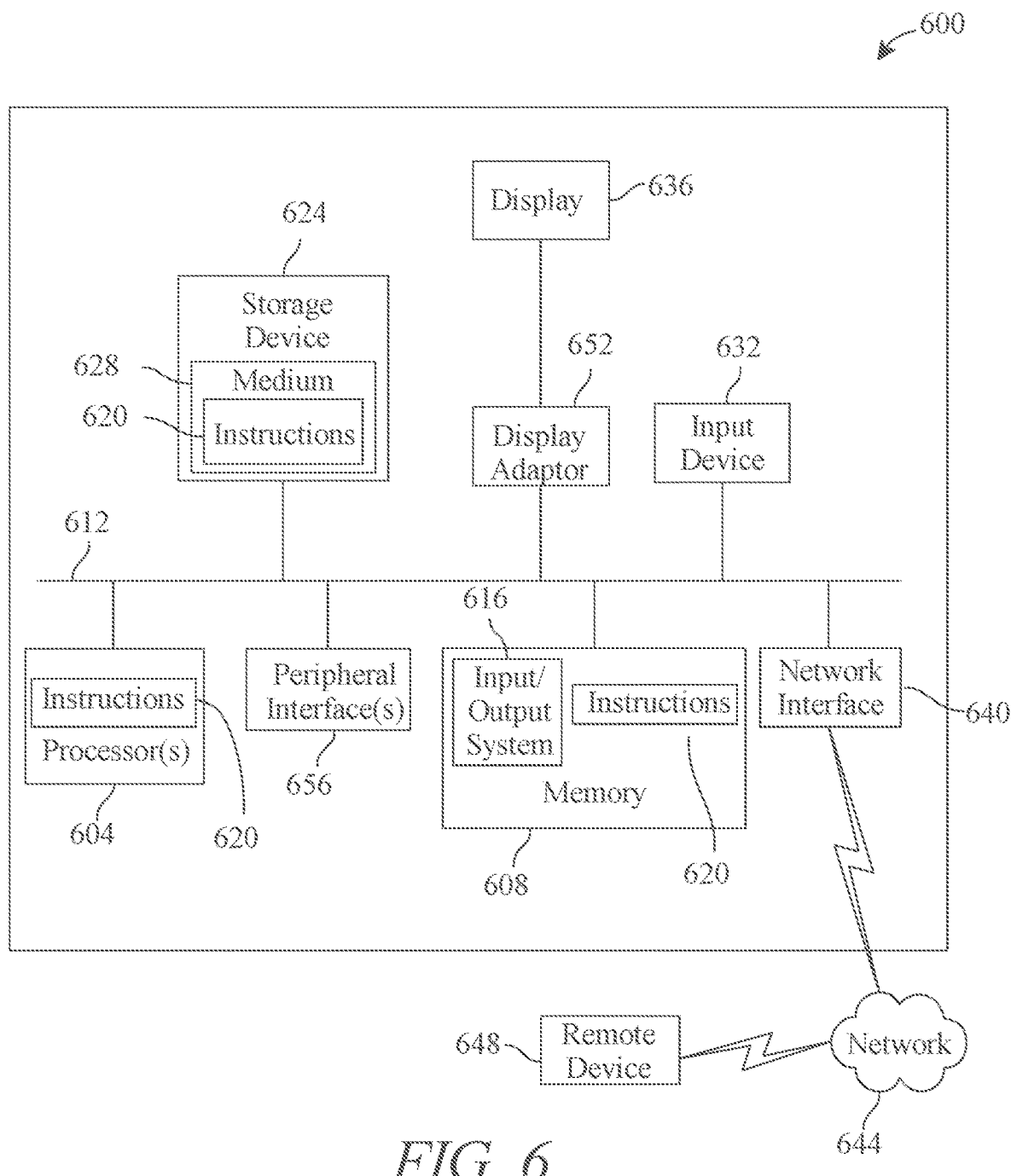
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for communicating data of a vehicle, the system comprising:
 a data recording device coupled to a vehicle, wherein the data recording device is configured to:
  receive at least one vehicle datum during operation of the vehicle;
  determine a subset of the at least one vehicle datum based on utilization of the subset of the at least one vehicle datum, wherein the subset of the at least one vehicle datum is stored during operation of the vehicle; and
  store the subset of the at least one vehicle datum as a stored vehicle at least one vehicle datum, wherein the stored vehicle at least one vehicle datum comprises a diagnostic datum of a vehicle component;
 a data transmitting device coupled to the vehicle, wherein the data transmitting device is configured to:
  initiate communication with an independent data communication device as a function of a connection to a network; and
  transmit the stored vehicle at least one vehicle datum to the independent data communication device as a function of the connection to the network; and
 a data upload application coupled to the independent data communication device, wherein the data upload application is configured to:
  determine if the stored vehicle at least one vehicle datum has been uploaded to the network by the independent data communication device within a set period of time initiating from a time of completion of a trip by the vehicle; and
  disable, as a function of the determination of the upload, subsequent operation of the vehicle.

2. The system of claim 1, wherein the data recording device and the data transmitting device comprise a single device.

3. The system of claim 1, wherein the diagnostic datum comprises at least a state of health datum of a power component of the vehicle.

4. The system of claim 3, wherein the power component comprises at least a battery.

5. The system of claim 1, wherein the independent data communication device is external to the vehicle.

6. The system of claim 1, wherein the system is further configured to include at least a sensor coupled to the vehicle, wherein the sensor is configured to detect the at least one vehicle datum during operation of the vehicle.

7. The system of claim 1, wherein the system is configured to include a flight controller coupled to the vehicle.

8. The system of claim 7, wherein the flight controller is configured to include:
 the data recording device; and
 the data transmitting device.

9. The system of claim 1, wherein the vehicle comprises an aircraft.

10. The system of claim 1, wherein the stored vehicle at least one vehicle datum is stored locally at the vehicle.

11. A method for communicating data of a vehicle, the method comprising:
 receiving, at a data recording device coupled to a vehicle, at least one vehicle datum during operation of the vehicle;
 determining, at the data recording device, a subset of the at least one vehicle datum based on utilization of the subset of the at least one vehicle datum, wherein the subset of the at least one vehicle datum is stored during operation of the vehicle;
 storing, at the data recording device, the subset of the at least one vehicle datum as a stored vehicle at least one vehicle datum, wherein the stored vehicle at least one vehicle datum comprises a diagnostic datum of a vehicle component;
 initiating, at a data transmitting device coupled to the vehicle, communication with an independent data communication device as a function of a connection to a network;
 transmitting, at the data transmitting device, the stored vehicle at least one vehicle datum to the independent data communication device as a function of the connection to the network;
 determining, at a data upload application coupled to the independent data communication device, if the stored vehicle at least one vehicle datum has been uploaded to the network by the independent data communication device within a set period of time initiating from a time of completion of a trip by the vehicle; and
 disabling, at the data upload application, as a function of the determination of the upload, subsequent operation of the vehicle.

12. The method of claim 11, wherein the data recording device and the data transmitting device comprise a single device.

13. The method of claim 11, wherein the diagnostic datum comprises at least a state of health datum of a power component of the vehicle.

14. The method of claim 13, wherein the power component comprises at least a battery.

15. The method of claim 11, wherein the independent data communication device is external to the vehicle.

16. The method of claim 11, wherein the method further comprises detecting, at least a sensor coupled to the vehicle, the at least one vehicle datum during operation of the vehicle.

17. The method of claim 11, wherein the method further comprises providing a flight controller coupled to the vehicle.

18. The method of claim 17, wherein the flight controller is configured to include:
 the data recording device; and
 the data transmitting device.

19. The method of claim 11, wherein the vehicle comprises an aircraft.

20. The method of claim 11, wherein the stored vehicle at least one vehicle datum is stored locally at the vehicle.

21. A computer program product for communicating data of a vehicle, the computer program product being embodied in a non-transitory computer readable medium and comprising computer instructions for:
 receiving, at a data recording device coupled to a vehicle, at least one vehicle datum during operation of the vehicle;

determining, at the data recording device, a subset of the at least one vehicle datum based on utilization of the subset of the at least one vehicle datum, wherein the subset of the at least one vehicle datum is stored during operation of the vehicle;

storing, at the data recording device, the subset of the at least one vehicle datum as a stored vehicle at least one vehicle datum, wherein the stored vehicle at least one vehicle datum comprises a diagnostic datum of a vehicle component;

initiating, at a data transmitting device coupled to the vehicle, communication with an independent data communication device as a function of a connection to a network;

transmitting, at the data transmitting device, the stored vehicle at least one vehicle datum to the independent data communication device as a function of the connection to the network;

determining, at a data upload application coupled to the independent data communication device, if the stored vehicle at least one vehicle datum has been uploaded to the network by the independent data communication device within a set period of time initiating from a time of completion of a trip by the vehicle; and disabling, at the data upload application, as a function of the determination of the upload, subsequent operation of the vehicle.

\* \* \* \* \*